United States Patent [19]

Tsuji

[11] Patent Number: 5,018,012
[45] Date of Patent: May 21, 1991

[54] VIDEO SIGNAL STRETCHER
[75] Inventor: Takehiro Tsuji, Saitama, Japan
[73] Assignee: Pioneer Electronic Corporation, Tokyo, Japan
[21] Appl. No.: 535,683
[22] Filed: Jun. 11, 1990
[30] Foreign Application Priority Data Jul. 21, 1989 [JP] Japan .................................. 1-084984

[51] Int. Cl.⁵ .............................................. H04N 5/16
[52] U.S. Cl. ..................... 358/171; 358/171; 358/172; 358/168; 358/34
[58] Field of Search .................. 358/34, 141, 171, 172, 358/176, 168; 330/11; 333/138; 307/540, 265, 243

[56] References Cited
U.S. PATENT DOCUMENTS

| 4,729,026 | 3/1988 | Suzuki et al. | 358/168 |
| 4,811,101 | 3/1989 | Yagi | 358/171 |
| 4,937,671 | 6/1990 | Engel | 358/169 |
| 4,975,773 | 12/1990 | Rabii | 358/169 |
| 4,977,460 | 12/1990 | Hirose | 358/336 |

Primary Examiner—John K. Peng
Assistant Examiner—Tuan V. Ho
Attorney, Agent, or Firm—Sughrue, Mion, Zinn, Macpeak & Seas

[57] ABSTRACT

The video signal stretcher comprises a signal adjusting circuit for adjusting a ratio of a synchronizing signal range to a video signal range, which video signal composes a composite picture signal together with the synchronizing signal, to become a predetermined value, whereby the DC level of the synchronizing signal is brought to coincide with the DC level of the video signal for stretching the black level of the video signal down to the pedestal level, further a composite picture signal having a set-up black level is stretched at the signal adjusting circuit so that a range of black and white levels becomes "100" against the synchronizing signal range of "40", and a DC level of a blanking period is set to a pedestal level of the composite picture signal whilst the black level of the video signal is stretched to the pedestal level, thus providing a stretched video signal having a range of 0–100 IRE with which a picture with no raised black can be displayed on a picture screen.

7 Claims, 8 Drawing Sheets

VIDEO SIGNAL STRETCHER

BACKGROUND OF THE INVENTION

1. Field of the Invention

This invention relates to a video signal stretcher of a type suitable for stretching a range of a video signal reproduced from storage media such as a video disc, video tape and the like.

2. Description of the Prior Art

Figure 8:
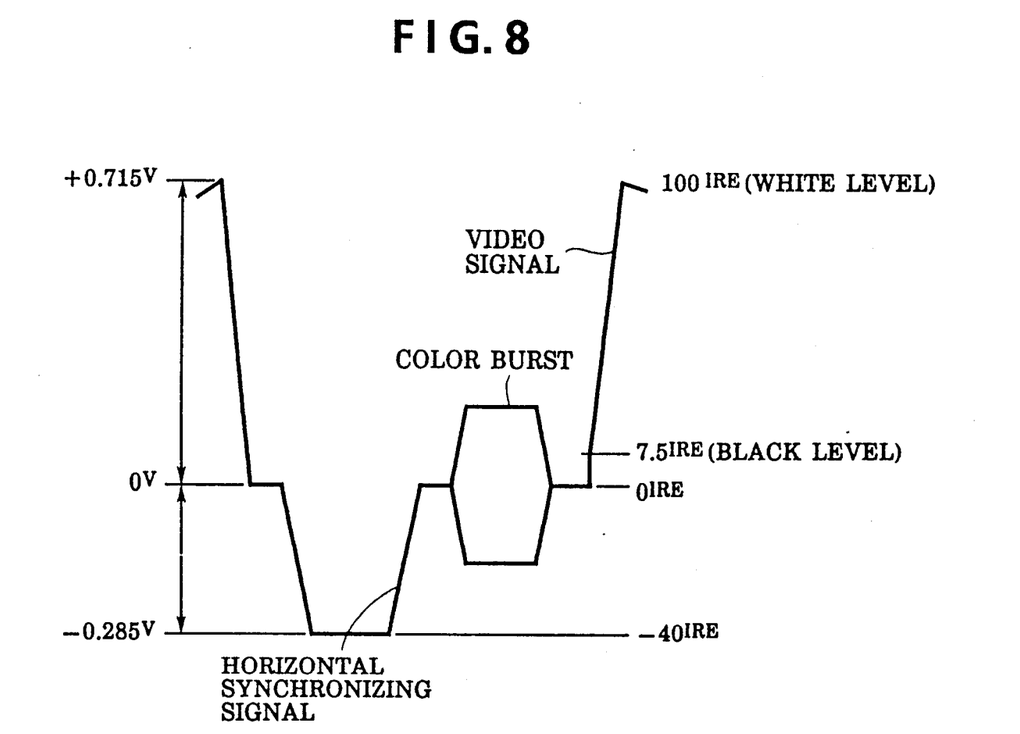
FIG. 8 is a waveform diagram showing a horizontal synchronizing signal of a composite picture signal.

In NTSC (National Television System Committee) color television system, a waveform of a composite picture signal (see FIG. 8) is standardized by a standard in which, by assigning a pedestal level to 0 V, a white peak level is set to +0.715 V and that a synchronizing signal level to −0.285 V, whereas a peak to peak voltage conforms to 1 Vp-p. Apart from this type of expression, the standard may be expressed in IRE scale, wherein the pedestal level is 0 IRE, the white peak level is +100 IRE and the synchronizing signal level is −40 IRE.

In the NTSC color television system, a black level was set to 7.5±0.25 IRE which is slightly higher than 0 IRE, however, the IRE scale has been revised recently to a range of 0-100 IRE. In accordance with this revision, the average black level is now set to 5.0 IRE which is approximately 0.04 V in MKSA system of units.

In existing standards for video software, two types of standards for video software are common on the market, whereas one type of video software is a conventional video signal of 7.5 to 100 IRE whilst the other type of video software is a new video signal of 0-100 IRE. For this reason, if a conventional video software is reproduced by a reproducer arranged for new video software, a reproduced video signal may be displayed on a picture screen as a whitened picture with high brightness. In this case, if a black level of the reproduced video signal is simply lowered from 7.5 IRE to 0 IRE, the reproduced video signal may vary its level within a range of 0 to 92.5 IRE, thus a white level is lowered and results in a dark image on the picture screen.

It is therefore an object of this invention to provide a video signal stretcher wherein a set-up black level of a video signal is brought to coincide with a pedestal level thereof by stretching the video signal.

SUMMARY OF THE INVENTION

The video signal stretcher according to the present invention comprises a signal adjusting circuit for adjusting a ratio of a synchronizing signal range to a video signal range, which video signal composes a composite picture signal together with the synchronizing signal, to become a predetermined value, and a DC level setting circuit for setting a DC level of the synchronizing signal to a pedestal level of the composite picture signal and setting a DC level of the video signal to a preliminarily set-up black level thereof, whereby the DC level of the synchronizing signal is brought to coincide with the DC level of the video signal for stretching the black level of the video signal down to the pedestal level.

Upon feeding a composite picture signal having a set-up black level to the video signal stretcher, firstly, it is stretched at the signal adjusting circuit so that a range of black and white levels becomes "100" against the synchronizing signal range of "40", and secondly, a DC level of the synchronizing signal period, i.e., the blanking period is set to a pedestal level of the composite picture signal whilst a DC level of the video signal period is set to the black level at the DC level setting circuit.

Accordingly, the black level of the video signal is stretched to the pedestal level, thus providing a stretched video signal having a range of 0-100 IRE with which a picture with no raised black can be displayed on a picture screen.

DESCRIPTION OF THE PREFERRED EMBODIMENTS

Preferred embodiments of the present invention will now be described in more detail with reference to the accompanying drawings in the several figures of which like reference numerals identify like elements.

Referring first to FIG. 1 and FIGS. 2A-2D, there are shown a block diagram of a video signal stretcher in accordance with this invention and waveforms at various parts thereof.

Figure 1:
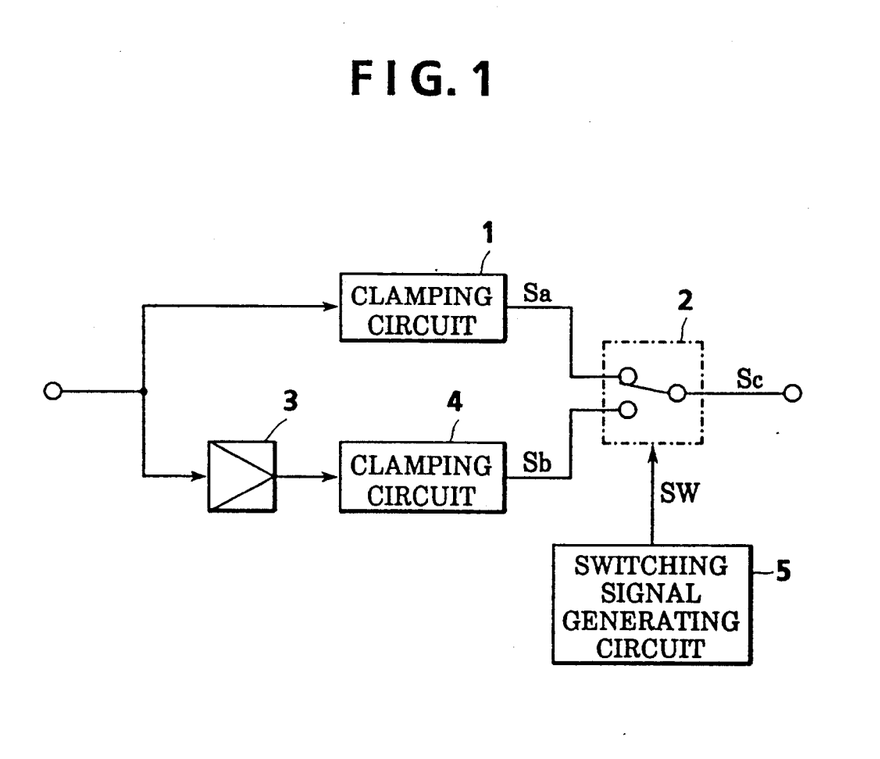
FIG. 1 is a block diagram showing an embodiment of this invention.
Figure 2A:
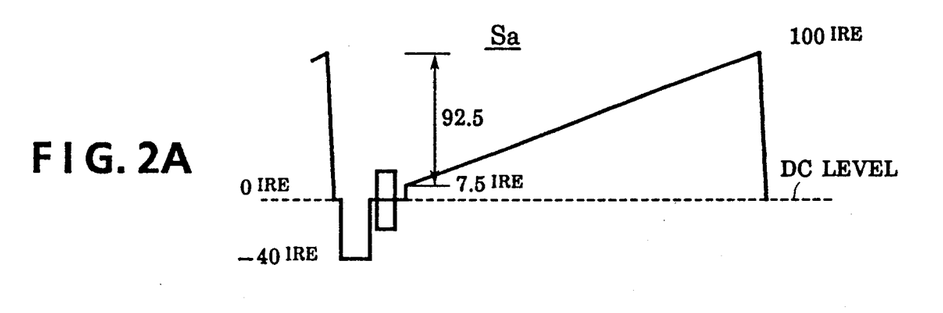
FIGS. 2A-2D are waveform diagrams showing waveforms at various parts of the video signal stretcher of FIG. 1.
Figure 2B:
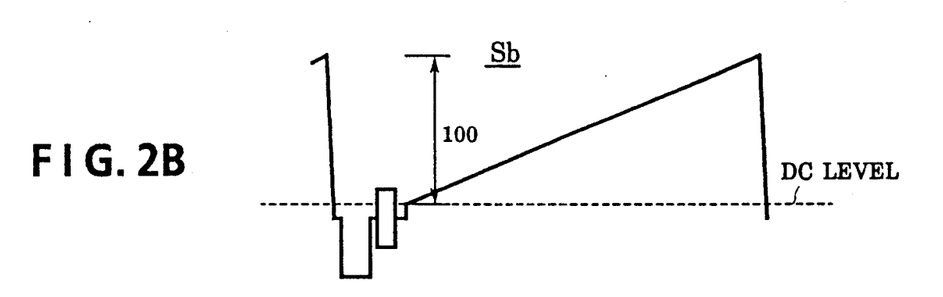
Figure 2C:
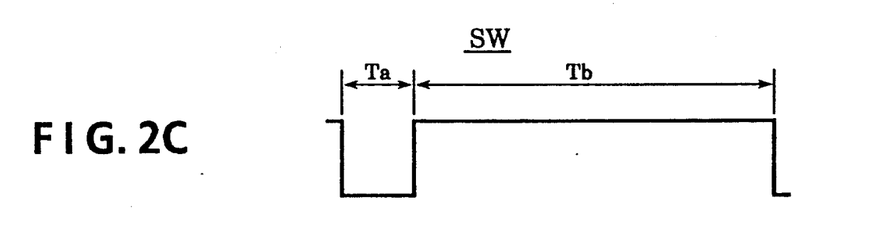
Figure 2D:
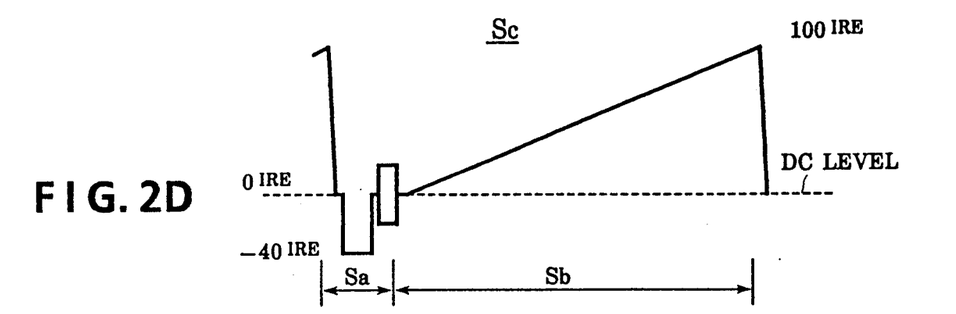

In FIG. 1, a clamp circuit 1 is a DC restoring circuit for setting a pedestal level of an incoming composite picture signal to a clamped DC level. An output of the clamp circuit 1 is fed to one input terminal of a switching circuit 2. An amplifier circuit 3 amplifies the incoming composite picture signal and supplies an amplified composite picture signal to another clamp circuit 4, and thereby it amplifies the composite picture signal having a range of black and white levels from 92.5 (between 7.5 and 100 IRE) to a range of 100.

The clamp circuit 4 is a DC restoring circuit for setting the black level of the composite picture signal amplified by the amplifier circuit 3 to a clamped DC level. An output of the clamp circuit 4 is fed to the other input terminal of the switching circuit 2. The switching circuit 2 is in turn controlled by a switching signal generated at a switching signal generating circuit 5 for selecting either of the outputs of the clamp circuit 1 and the clamp circuit 4.

If a composite picture signal having IRE scale of 7.5 to 100 IRE and a set-up black level is fed to the video signal stretcher of FIG. 1, the clamp circuit 1 sets the pedestal level to the DC level and sends the DC restored composite picture signal Sa (FIG. 2A) to the switching circuit 2. On the other hand, the composite picture signal is amplified at the amplifier circuit 3 in such a manner that the range of black and white levels becomes 100, and then the amplified composite picture signal is fed to the clamp circuit 4. The clamp circuit 4 sets the black level of the incoming composite picture signal to the DC level and supplies the DC restored composite picture signal Sb (FIG. 2B) to the switching circuit 2.

The switching circuit 2 is provided for taking out the composite picture signal Sa in a duration of blanking period Ta whilst the amplified composite picture signal Sb in a duration of video signal period Tb by switching the outputs of the clamp circuit 1 and the clamp circuit 4 in an alternative manner based on a switching signal SW (FIG. 2C) fed from the switching signal generating circuit 5. That is, in the duration of blanking period Ta, the switching circuit 2 selects the output signal Sa of the clamp circuit 1 and that the output signal Sb of the clamp circuit 4 in the duration of video signal period Tb.

Accordingly, the composite picture signal Sc (FIG. 2D) derived from the switching circuit 2 is a signal being stretched from 0 IRE for the black level to 100 IRE for the white level.

Figure 3:
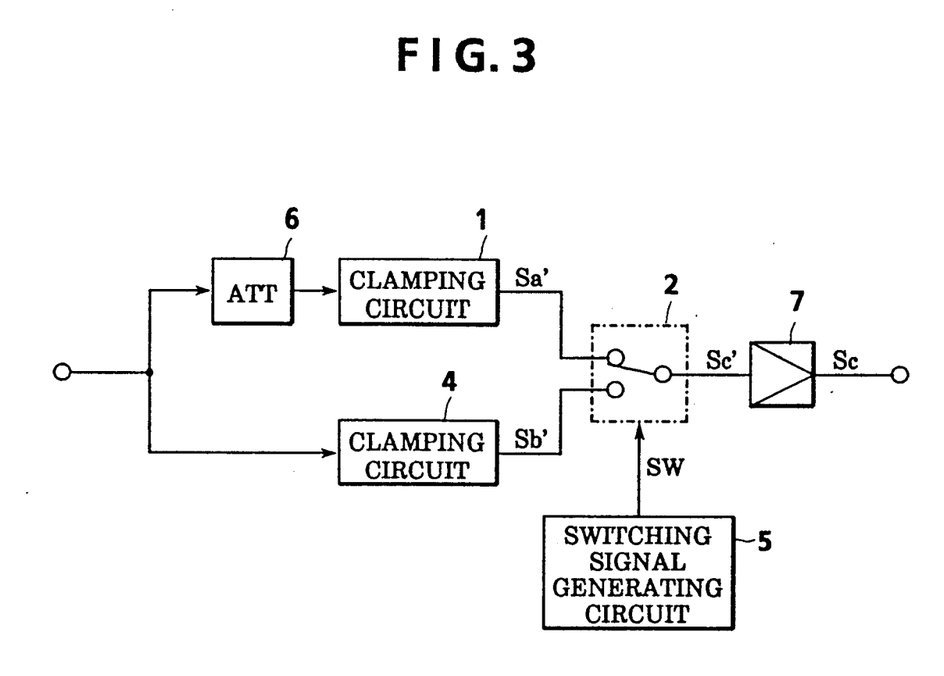
FIG. 3 is a block diagram showing another embodiment of this invention.

Referring now to FIG. 3, there is shown a block diagram of another embodiment of this invention.

This embodiment has a circuit configuration similar to that of the FIG. 1 except for some modifications. In this embodiment, an attenuator circuit 6 is provided in front of the clamp circuit 1 for attenuating the incoming composite picture signal and that an amplifier circuit 7 at the output side of the switching circuit 2, whereas eliminating the amplifier circuit 3 which is provided in the embodiment of FIG. 1 for introducing the incoming composite picture signal directly into the clamp circuit 4.

According to this embodiment of the present invention, the incoming composite picture signal is attenuated by the attenuator circuit 6 so that an attenuated synchronizing signal levels become 40 with respect to the unattenuated picture signal levels of 100. The attenuated composite picture signal is then clamped by the clamp circuit 1 to the DC level at the pedestal level thereof for setting the DC level and an output thereof is fed to the switching circuit 2 as a DC restored composite picture signal Sa'.

The composite picture signal fed directly to the clamp circuit 4 has a black level of 7.5 IRE, and thereby the black level is clamped to the DC level, hence an output the clamping circuit 4 is fed to the switching circuit 2 as a DC restored composite picture signal Sb'.

By selecting the composite picture signal Sa' for the blanking period of Ta and that the composite picture signal Sb' for the video signal period of Tb, a composite picture signal Sc' is attained at the output of the switching circuit 2. The composite picture signal Sc' has such a ratio of 40 to 100 for the synchronizing signal levels to the video signal levels. Further, the composite picture signal Sc' is amplified by the amplifier circuit 7 for providing a composite picture signal Sc having a peak to peak voltage of 1 Vp-p.

Figure 4:
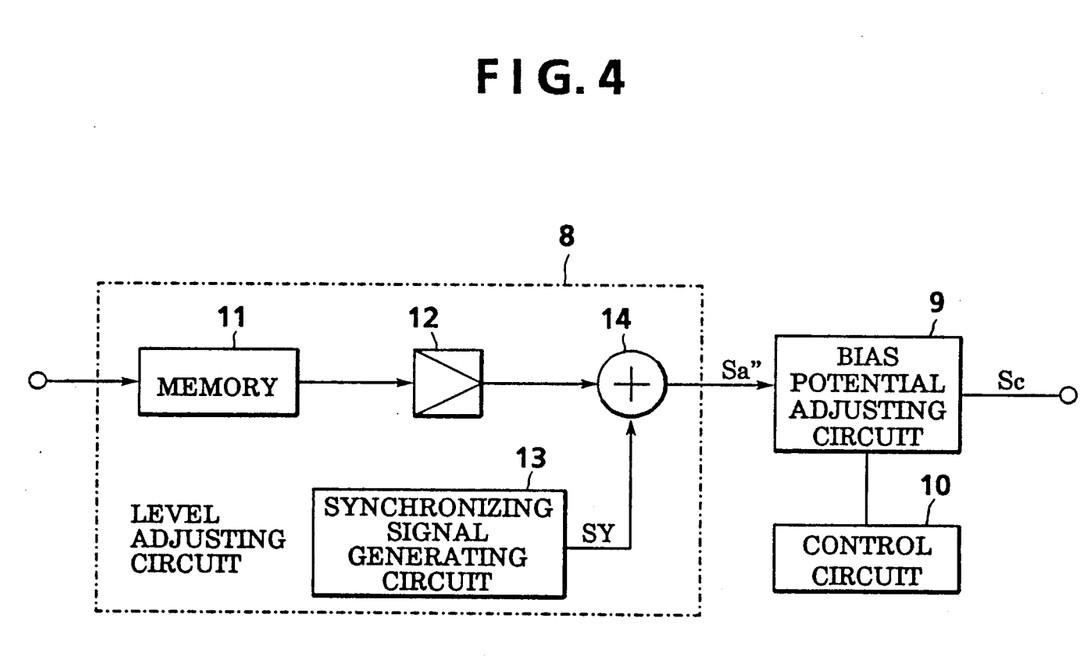
FIG. 4 is a block diagram showing still another embodiment of this invention.
Figure 5A:
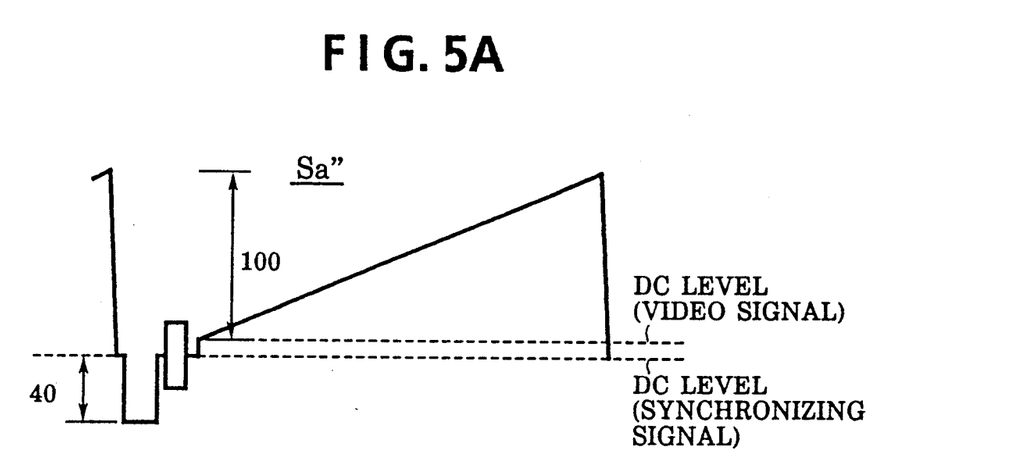
FIGS. 5A and 5B are waveform diagrams showing waveforms of the embodiment of FIG. 4.
Figure 5B:
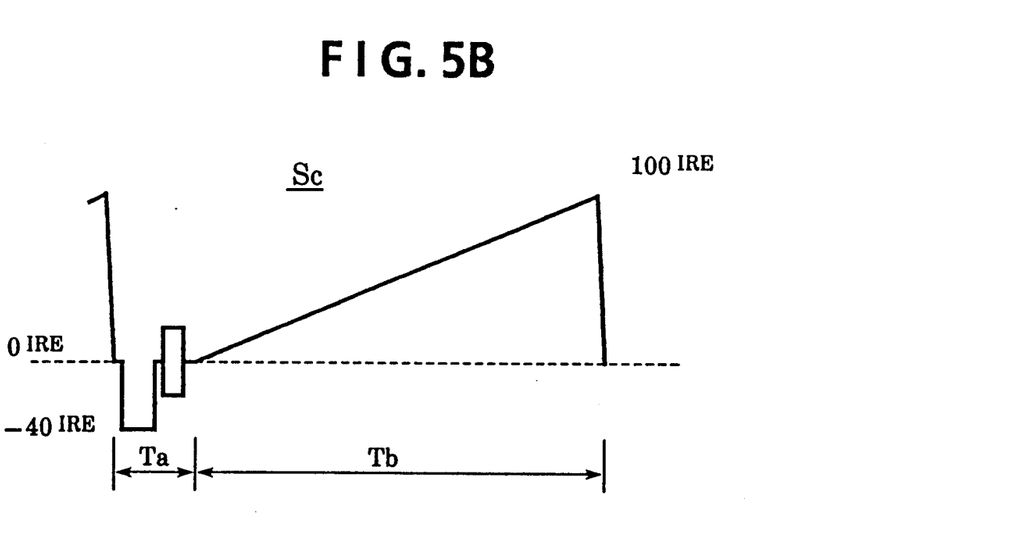

Referring now to FIGS. 4, 5A and 5B, there are shown still another embodiment of this invention and waveforms therefor.

In accordance with this embodiment of the invention, a video signal stretcher consists of a level adjusting circuit 8 for setting the ratio of the synchronizing signal levels to the video signal levels in the composite picture signal to conform to the ratio of 40 to 100, a bias potential adjusting circuit 9 for adjusting a DC level of the composite picture signal, and a control circuit 10 for controlling the bias potential adjusting circuit 9. The level adjusting circuit 8 consists of a memory 11 for storing a video signal with no synchronizing signal reproduced from a video disc, an amplifier circuit 12 for amplifying the video signal read out from the memory 11 in order to make a range of black and white levels of the read out video signal to 100, a synchronizing signal generating circuit 13 for generating a synchronizing signal SY, and an adder circuit 14 for adding the synchronizing signal SY to the video signal from the amplifier circuit 12.

In accordance with this configuration, since a range of the synchronizing signal of the composite picture signal Sa'' (FIG. 5A) derived from the level adjusting circuit 8 is allocated to 40 in levels and that a range of the video signal to 100 in levels, the composite picture signal Sc (FIG. 5B) is set respectively to a range of 0--40 IRE for the synchronizing signal and a range of 0-100 IRE for the video signal, by setting the pedestal level to the DC level in a duration of blanking period Ta and that the black level to the DC level in a duration of video signal period Tb, through the bias potential adjusting circuit 9.

In this way, the video signal carrying the black level at 7.5 IRE can be stretched to a video signal having a black level at 0 IRE.

In the foregoing embodiments of the invention, it has been assumed that the video signal being fed has the range of 7.5 to 100 IRE, so that if a video signal having the range of 0 to 100 IRE is fed instead, the black level may become lower than the pedestal level, thus resulting in a cause of a black compression or an out of synchronization.

Figure 6:
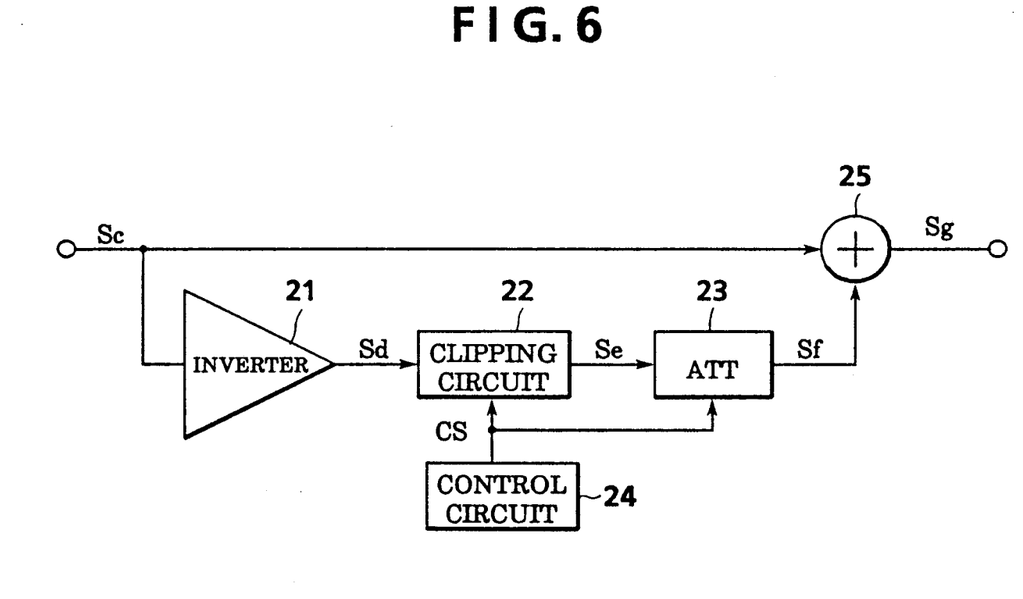
FIG. 6 is a block diagram showing a stretch correcting circuit.

This problem can be eliminated by feeding the stretched composite picture signal Sc through a stretch compensating circuit shown in FIG. 6. The stretch compensating circuit consists of an inverter 21, a clipping circuit 22, an attenuator 23, an adder 25 and a control circuit 24 for controlling the clipping circuit 22 and the attenuator 23.

Figure 7A:
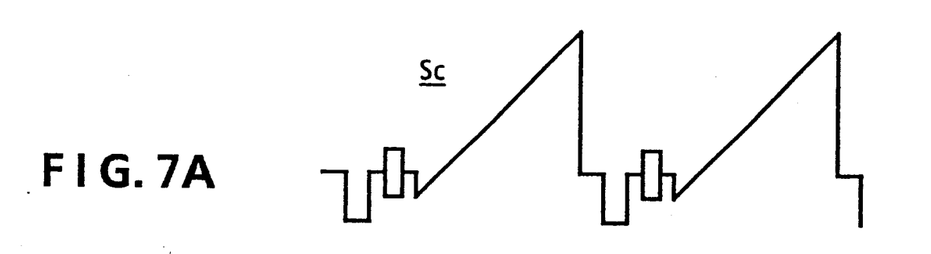
FIGS. 7A-7F are waveform diagrams showing waveforms at various parts of the embodiment of FIG. 6.
Figures 7B, 7C:
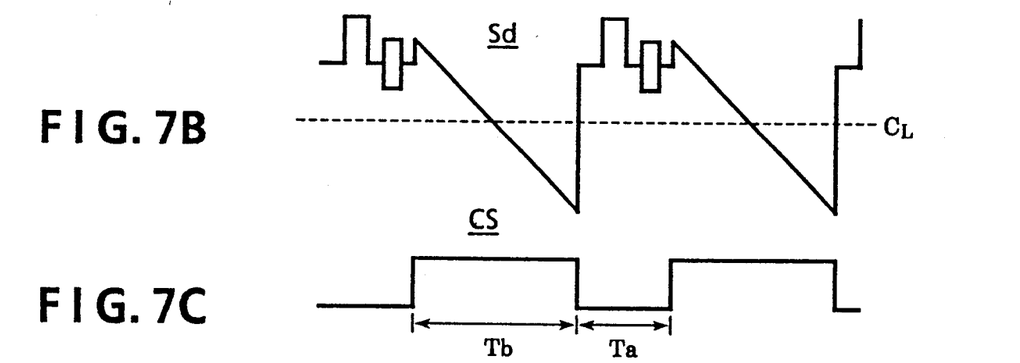
Figure 7D:
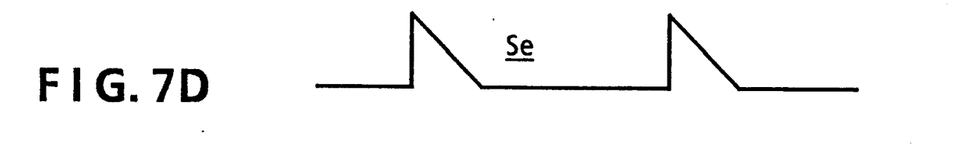

In accordance with this configuration, the incoming composite picture signal Sc (FIG. 7A) is inverted by the inverter 21 and fed to the clipping circuit 22 as a composite picture signal Sd (FIG. 7B). The clipping circuit 22 is brought into operation only for a duration of video signal period Tb by a control signal CS (FIG. 7C) fed from the control circuit 24 and derives a signal Se (FIG. 7D) which exceeds a clipping level CL therefrom.

Figure 7E:
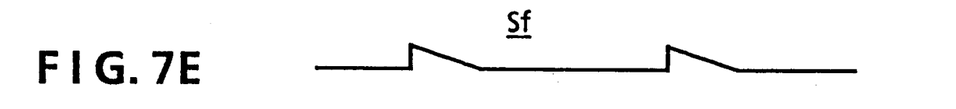
Figure 7F:
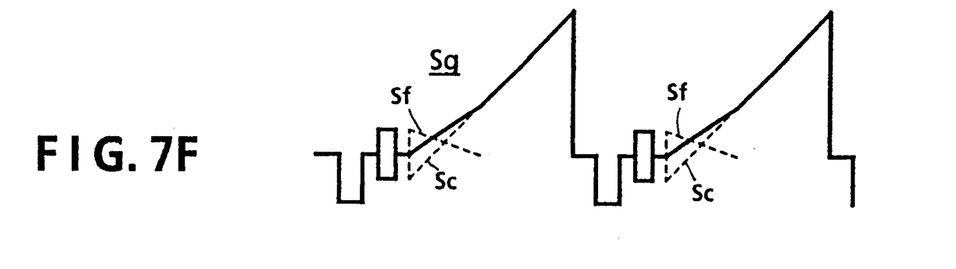

The clipped signal Se is attenuated by the attenuator 23 to produce an attenuated signal Sf (FIG. 7E), and this attenuated signal is then added to the stretched composite picture signal Sc by the adder 25 to provide a composite picture signal Sg (FIG. 7F) having a video signal being removed at a part lower than the pedestal level.

A clipping level of the clipping circuit 22 and an amount of attenuation of the attenuator 23 can be set freely, however, they are not independent in setting but the amount of attenuation is determined in consideration of the clipping level.

The aforementioned compensated composite picture signal may be attained by substituting a limiter for the stretch compensation circuit of FIG. 6, whereby, by setting a limiter level to the pedestal level, the composite picture signal Sc is fed through the limiter for attaining the composite picture signal Sg having a video signal which rises gradually from the pedestal level.

In accordance with this invention, since the setup black level of the video signal is stretched down to a pedestal level side, it is possible to eliminate a black rise, further a chrominance level can be expanded and a clear color picture enriched in color may be displayed on the picture screen.

While the present invention has been described in detail with reference to the preferred embodiments, it should be apparent to those skilled in the art that various modification can be made without departing from the spirit and scope of the invention, accordingly, the invention is not to be limited except as by the appended claims.

What is claimed is:

1. A video signal stretcher comprising:
   signal adjusting means for adjusting a ratio of a range of a synchronizing signal and a range of a video signal, which signals form a composite video signal, to become a predetermined value; and
   DC level setting means for setting a DC level of the synchronizing signal to a pedestal level and that a DC level of the video signal to a preliminarily set-up black level;
   whereby the black level of the video signal is stretched to the pedestal level by aligning the DC level of the video signal with the DC level of the synchronizing signal.

2. A video signal stretcher comprising:
   a first clamping circuit connected to an input terminal;
   a second clamping circuit connected to the input terminal through an amplifier;
   a switching circuit connected to the first and second clamping circuits with its selectable contacts and to an output terminal with its selecting contact for deriving an output therefrom by switching outputs of the both clamping circuits alternatively; and
   a switching signal generating circuit for controlling the switching circuit;
   whereby the output of the first clamping circuit is fed to the output terminal in a duration of a blanking period and that the output of the second clamping circuit in a duration of a video signal period.

3. A video signal stretcher comprising:
   a first clamping circuit connected to an input terminal through an attenuator;
   a second clamping circuit connected to the input terminal;
   a switching circuit connected to the first and second clamping circuits with its selectable contacts and to an output terminal with its selecting contact for deriving an output therefrom by switching outputs of the both clamping circuits alternatively; and
   a switching signal generating circuit for controlling the switching circuit;
   whereby the output of the first clamping circuit is fed to the output terminal in a duration of a blanking period and that the output of the second clamping circuit in a duration of a video signal period.

4. A video signal stretcher comprising:
   a level adjusting circuit for setting a ratio of a synchronizing signal level and a video signal level to 40 to 100 for deriving a composite picture signal therefrom;
   a bias potential adjusting circuit for receiving the composite picture signal from the level adjusting circuit; and
   a control circuit for controlling the bias potential adjusting circuit;
   whereby a pedestal level of the composite picture signal is set to a DC level in a duration of a blanking period and a black level of the composite picture signal in a duration of a video signal period.

5. A video signal stretcher as claimed in claim 4, wherein said level adjusting circuit consists of a memory for storing a video signal, a video signal amplifier, a synchronizing signal generator and an adder which adds an output of the synchronizing signal generator to an output of the video signal amplifier.

6. A video signal stretcher as claimed in claim 1, 2, 3 or 4, further including a stretch compensation circuit;
   whereby an over stretching of a video signal is compensated by clipping a part of an inverted video signal and adding it to the stretched video signal.

7. A video signal stretcher as claimed in claim 6, wherein said stretcher compensation circuit consists of an inverter, a clipping circuit, an attenuator, an adder and a control circuit for controlling a clipping level of the clipping circuit and an amount of attenuation of the attenuator.

* * * * *